(12) United States Patent
Belliveau (10) Patent No.: US 7,055,964 B2
(45) Date of Patent: Jun. 6, 2006

(54) CONTENT OPTIMIZING SYSTEM FOR AN IMAGE PROJECTION LIGHTING DEVICE

(76) Inventor: Richard S. Belliveau, 10643 Floral Park., Austin, TX (US) 78759

( * ) Notice: Subject to any disclaimer, the term of this patent is extended or adjusted under 35 U.S.C. 154(b) by 0 days.

(21) Appl. No.: 11/271,533

(22) Filed: Nov. 10, 2005

(65) Prior Publication Data

US 2006/0061737 A1   Mar. 23, 2006

Related U.S. Application Data

(63) Continuation of application No. 10/790,265, filed on Mar. 1, 2004.

(51) Int. Cl.
*G03B 21/20* (2006.01)
(52) U.S. Cl. .................... 353/87; 353/119; 353/28
(58) Field of Classification Search .................. 353/28, 353/11, 29, 35, 87, 94, 119–122; 348/761, 348/829; 359/446; G03B 21/20
See application file for complete search history.

(56) References Cited

U.S. PATENT DOCUMENTS

| | | | | |
|---|---|---|---|---|
| 4,912,558 A | * | 3/1990 | Easterly et al. | 358/447 |
| 5,023,709 A | * | 6/1991 | Kita et al. | 348/172 |
| 5,114,224 A | * | 5/1992 | Miyamoto et al. | 353/122 |
| 5,829,868 A | | 11/1998 | Hutton | 362/276 |
| 5,913,072 A | * | 6/1999 | Wieringa | 710/12 |
| 5,982,363 A | * | 11/1999 | Naiff | 715/721 |
| 5,988,817 A | * | 11/1999 | Mizushima et al. | 353/94 |
| 6,057,958 A | | 5/2000 | Hunt | 359/291 |
| 6,172,716 B1 | * | 1/2001 | Karlock | 348/575 |
| 6,412,972 B1 | * | 7/2002 | Pujol et al. | 362/272 |
| 6,671,005 B1 | * | 12/2003 | Pujol et al. | 348/771 |
| 6,719,433 B1 | * | 4/2004 | Belliveau | 353/122 |
| 6,783,251 B1 | * | 8/2004 | Belliveau | 353/122 |
| 6,866,390 B1 | * | 3/2005 | Belliveau | 353/122 |
| 6,869,193 B1 | * | 3/2005 | Belliveau | 353/122 |

OTHER PUBLICATIONS

"The High End System Product Line 2001".
"Catalyst DL 2000"© 2003, High End System Inc.

* cited by examiner

*Primary Examiner*—W. B. Perkey
*Assistant Examiner*—Andrew Sever
(74) *Attorney, Agent, or Firm*—Walter J. Tencza, Jr.

(57) ABSTRACT

An image projection lighting device is disclosed having a processor and communications port. The communications port may receive a contrast command. The processor may modify contrast of image data in response to the contrast command to form contrast modified image data. The communications port may receive a black level command. The processor may modify image data in response to the black level command to form modified image data having a modified black level. Modified black level image data may be created by adding or subtracting an offset to the image data.

18 Claims, 5 Drawing Sheets

CONTENT OPTIMIZING SYSTEM FOR AN IMAGE PROJECTION LIGHTING DEVICE

CROSS REFERENCE TO RELATED APPLICATION(S)

The present application is a continuation of and claims the priority of U.S. patent application Ser. No. 10/790,265, titled "CONTENT OPTIMIZING SYSTEM FOR AN IMAGE PROJECTION LIGHTING DEVICE" filed on Mar. 1, 2004.

FIELD OF THE INVENTION

The present invention relates to image projection lighting devices.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multi-parameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter lighting fixture is an image projection lighting device ("IPLD"). Image projection lighting devices of the prior art typically use a light valve or light valves to project images onto a stage or other projection surface. A light valve, which is also known as an image gate, is a device for example such as a digital micro-mirror ("DMD") or a liquid crystal display ("LCD") that forms the image that is projected. Either a transmissive or a reflective type light valve may be used. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to an image gate to produce animated and real-time imaging. A single frame can also be manipulated through processing to produce multiple variations. Alternatively, a video communication link can be employed to supply continuous video from a remote source.

IPLDs of the prior art use light from a projection lamp that is sent through a light valve and focused by an output lens to project images on a stage or a projection surface. The control of the various parameters of the IPLDs is affected by an operator using a central controller. In a given application, a plurality of IPLDs are used to illuminate the projection surface, with each IPLD having many parameters that may be adjusted by a central controller to create a scene.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. Content is typically comprised of still images, video images or loops and computer graphical images.

The Catalyst (trademarked) DL1 image projection lighting device manufactured by High End Systems of Austin Tex. incorporates a video projector into an environmentally protective housing that can be remotely positioned to projected images to different locations upon the stage or projection surface. A personal computer is used as a server that provides the images to the DL1. A lighting controller sends command signals over a communication system to control the selection of images from the server to the projector as well as control the various functions of the DL1 and the position of the image on the projection surface.

The content or video images may reside as image data stored at the central controller or the content or images may reside as data stored in the memory of the IPLD. The content (also can be referred to as video or still images herein referred to as just images) can be created by a graphics artist on a personal computer. The graphics artist may use programs such as Adobe Photoshop (trademarked) manufactured by Adobe Systems of San Jose, Calif. of Final Cut Pro (trademarked) manufactured by Apple Computer of Cupertino, Calif. to create images.

A central control system for controlling a plurality of IPLDs is described in U.S. patent application titled: "Method and apparatus for controlling images with image projection lighting devices" filed Jul. 29, 2002 by inventor Richard S Belliveau, Ser. No. 10/206,162 and is incorporated herein for reference.

It has been found that when a graphics artist creates images that can be used as content for many applications, the artist is not always concerned with the optimal performance of the images as projected by an IPLD. Often times the graphics artist may not have advanced knowledge of how the images need to be produced for optimum performance when projected by an IPLD. For example the images created by the graphics artist may look fine on the artist's CRT or LCD screen but the images may not reach the maximum brightness capability of the IPLD when projecting onto the projection surface.

The images that were created by the graphics artist when projected by an IPLD onto a projection surface may not reach the full brightness potential of the IPLD. It's also possible that the darkest part of the images may not reach the best black level potential of the IPLD. When images projected by an IPLD fail to reach the full brightness level or best black level the visual performance of the IPLD suffers in the eyes of the audience.

There is a need to create a system for optimizing the images that are projected by IPLDS onto the projection surface. The system should optimize the images projected by an IPLD to be projected at maximum brightness levels. The system may also insure that the darkest components of the images that are projected by an IPLD obtain the best black level.

SUMMARY OF THE INVENTION

The present invention in one or more embodiments includes an apparatus comprising an image projection lighting device. The image projection lighting device may be comprised of a base housing. An electrical component may be located within the base housing. The image projection lighting device may be further comprised of a yoke, a communications port, a processor, and a lamp housing. The lamp housing can be remotely positioned in relation to the base housing. The lamp housing may have located therein a lamp, and a first light valve. The communications port may receive a contrast command. The processor may modify contrast of image data in response to the contrast command to form contrast modified image data.

The contrast modified image data may be created by applying gain to the image data. The image data may contain red, green, and blue components and the gain may be applied to the red, green, and blue components equally. The gain applied to the image data may cause clipping of the bright components of the image data. The clipping may be greater than ten percent.

The communications port may receive a black level command. The processor may modify image data in response to the black level command to form modified image data having a modified black level. Modified black level image data may be created by adding or subtracting an offset to the image data. An offset applied to the image data may be used to cause clipping of the darker components of the image data.

In one or more embodiments, a lighting system under control of an operator, may apply a contrast command to image data to form modified image data. The lighting system may include a plurality of image projection lighting devices. The image data may have an original image coloration. The modified image data may substantially preserve the original image coloration. The modified image data can be projected onto a projection surface by any one of the plurality of image projection lighting devices of the lighting system and the modified image data can produce a brighter image than the image data.

A contrast command may cause a function to be applied to the image data. The function applied to the image data may be gain. The gain applied to the image may cause clipping of the bright components of the image. The function may be applied by a processor. The processor may be a component of one of a plurality of image projection lighting devices. The processor may be a component of the central controller.

A black level may cause a function to be applied to the image data. The function applied to the image data may be an offset. The offset applied to the image may cause clipping of the darker components of the image. The function may be applied by a processor. The processor may be a component of one of a plurality of image projection lighting devices. The processor may be a component of the central controller.

DETAILED DESCRIPTION OF THE DRAWINGS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

Figure 1:
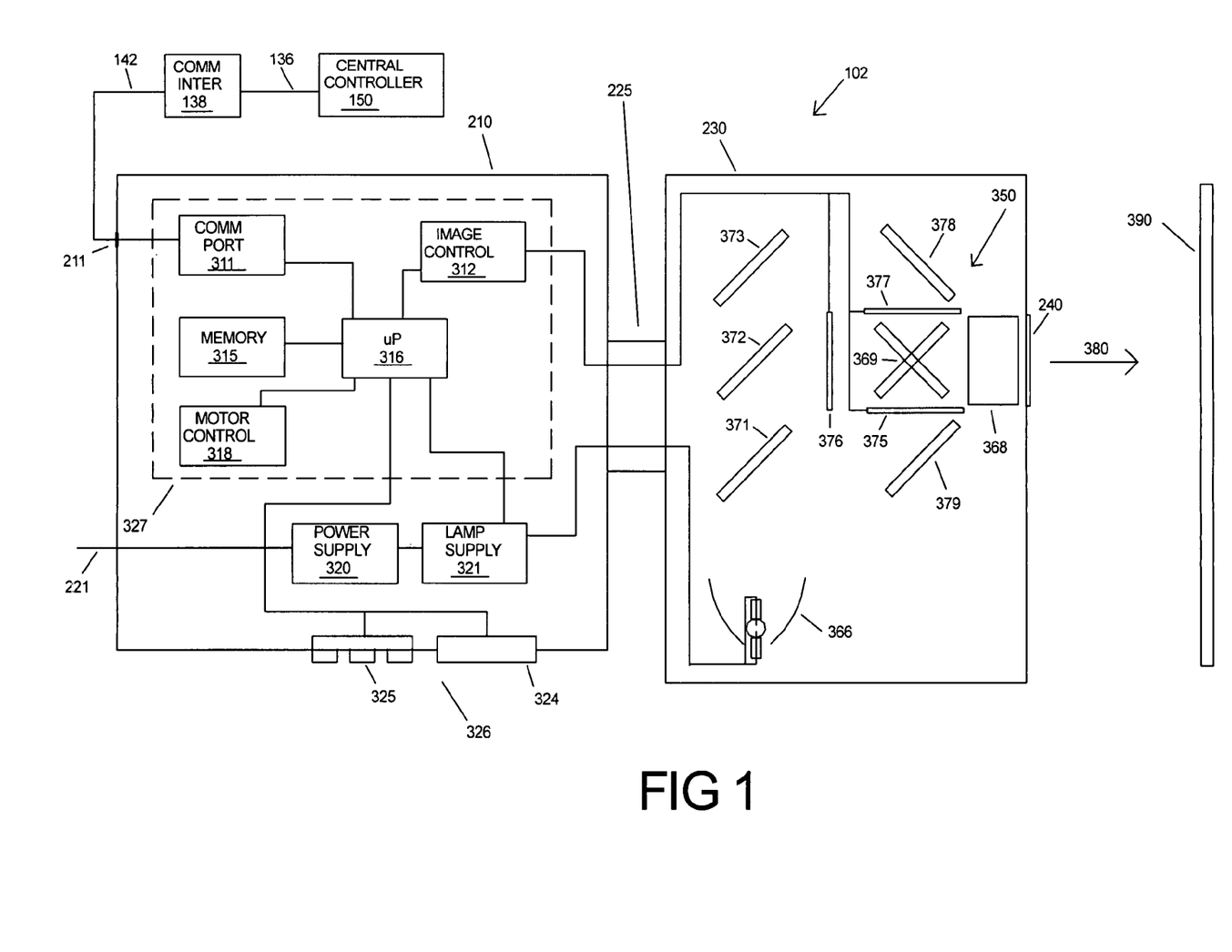
FIG. 1 shows a lamp housing, a base housing and the components therein for an image projection lighting device ("IPLD") in accordance with an embodiment of the present invention.

FIG. 1 is a block diagram of an embodiment of the present invention showing components within or part of a base housing 210 and within or part of a lamp housing 230 of an IPLD 102. FIG. 1 also shows a central controller 150. An electronic control system 327 can be contained in the base housing 210. The electronic control system 327 is comprised of at least a processing system such as a processor 316. The processor 316 may be made up of discrete electronic parts or the processor 316 may be made up of several processors. The components within or part of the base housing 210 include a communications port (shown as "comm port") 311, a connection point 211, an image control 312, a memory 315, a microprocessor or processor 316, a motor control 318, a power supply 320 and a lamp power supply 321. A bearing 225 is shown rotatably connecting the lamp housing 230 to the base housing 210, in FIG. 1, i.e. bearing 225 connects the lamp housing 230 to the base housing 210 so that the lamp housing 230 can rotate with respect to the base housing 210. Although only one bearing 225 is shown for simplification more than one bearing may rotatably connect the lamp housing 230 to the base housing 210. A display device 324 is also shown within or connected to the base housing 210. The display device 324 may be a display for alphanumeric characters or a video display capable of displaying video images. The display device 324 may also be a touch screen display that accepts input commands. An input keypad 325 is also shown within or connected to the base housing 210. The input keypad 325 together with the display device 324 can be called a stand-alone control system 326. The stand-alone control system 326 can be used to enter data and or to control the parameters of the IPLD 102. The stand-alone control system 326 may only be comprised of the display device 324.

The components within or part of the lamp housing 230 include the lamp 366 that directs white light towards a red color separation filter 371. The red color separation filter 371 reflects red light from the white light created by the lamp 366 and the variable homogenizing system 362 to a reflecting mirror 379 where it is directed to a red light valve 375 and the imaged red light passes to a color combining system 369. Blue green light passes though the red color separation filter 371 and is directed to a green color separation filter 372 that in turn reflects green light to a green light valve 376 that passes imaged green light to the color combining system 369. The green separation filter 372 passes blue light that is sent to a blue separation filter 373 and the blue light is reflected off the blue separation filter 373 and passed to a reflector 378. The reflector 378 reflects the blue light to a blue light valve 377 where the imaged blue light is directed to the color combining system 369. The order of the color separation filters may be different. Color combining system 369 combines the imaged red, green and blue light that has been imaged by the red, green and blue light valves 375, 376 and 377, respectively and passes the multicolored lighted images to a zoom and focus lens 368 where it is directed through the aperture 240 in the direction of arrow 380 to the projection surface 390. The red, blue and green light valves 375, 376 and 377 respectively, are controlled to produce images by the image control 312. The image control 312 can be a video graphics card with a memory and a graphics processor.

The central controller 150 outputs address and control commands over a communications system, which may include communications interface 138. The communications interface 138 is connected to the communications port 311 by communications line 142 and connection point 211 as shown in FIG. 1. The communications port 311 may be a part of the processor 316. The communications port 311 can be any device capable of receiving the communication sent over the communications system. The communications interface 138 may be a router or hub as known in the communications art. The communications interface 138 may not be required for some communications systems.

The image control 312 of the electronics housing 210 provides control signals to the light valves 375, 376, and 377 in the lamp housing 230. The microprocessor 316 in the electronics housing 210 provides control signals to the image control 312. The microprocessor 316 is shown electrically connected to the memory 315. The memory 315 stores the software operating system for the IPLD 102 and possibly different types of electronic image content used to form pixel mapped images at the image control 312. The pixel-mapped images are used by the image control to provide the control signals to the light valves 375, 376 and 377. The light valves shown as 375, 376 and 377 are shown as transmissive type light valves where light from the projection lamp 366 is directed to the light valves to be transmitted through the light valves 375, 376 and 377 to the lens 368. As known in the prior art, a light valve can be a reflective light valve where light from the projection lamp 366 is directed to the light valves 375, 376 and 377 to be reflected from the light valves 375, 376, and 377 to the lens 368.

The motor control 318 is electrically connected to the motors or actuators such the pan and tilt motors (not shown) and the motor 318 may be used to position the lamp housing 230 relative to the base housing 210. The electrical connection to all of the motors is not shown for simplification. The motors may be stepping motors, servomotors, solenoids or any other type of actuators.

The motor control 318 is electrically connected to receive control signals from the microprocessor 316. Two power supplies are shown in FIG. 1. A power supply 320 is shown for supplying energy to the motors and may also supply power to the electronic components. A lamp power supply 321 is shown for supplying power to the main projection light source or lamp 366. The lamp power supply 321 may be signaled by the processor 316 to control the lamp 366 to be on, off or vary the power to the lamp. The lamp power supply 321 may send signals to the processor 316 as to the condition of the lamp such as on, off or if there is a fault condition. The processor 316 may keep track of the number of hours that the light source or lamp 366 is illuminated so that data representing the total hours of illumination of the lamp 366 can be stored in the memory 316.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 390 from the lens 368 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

Figure 2:
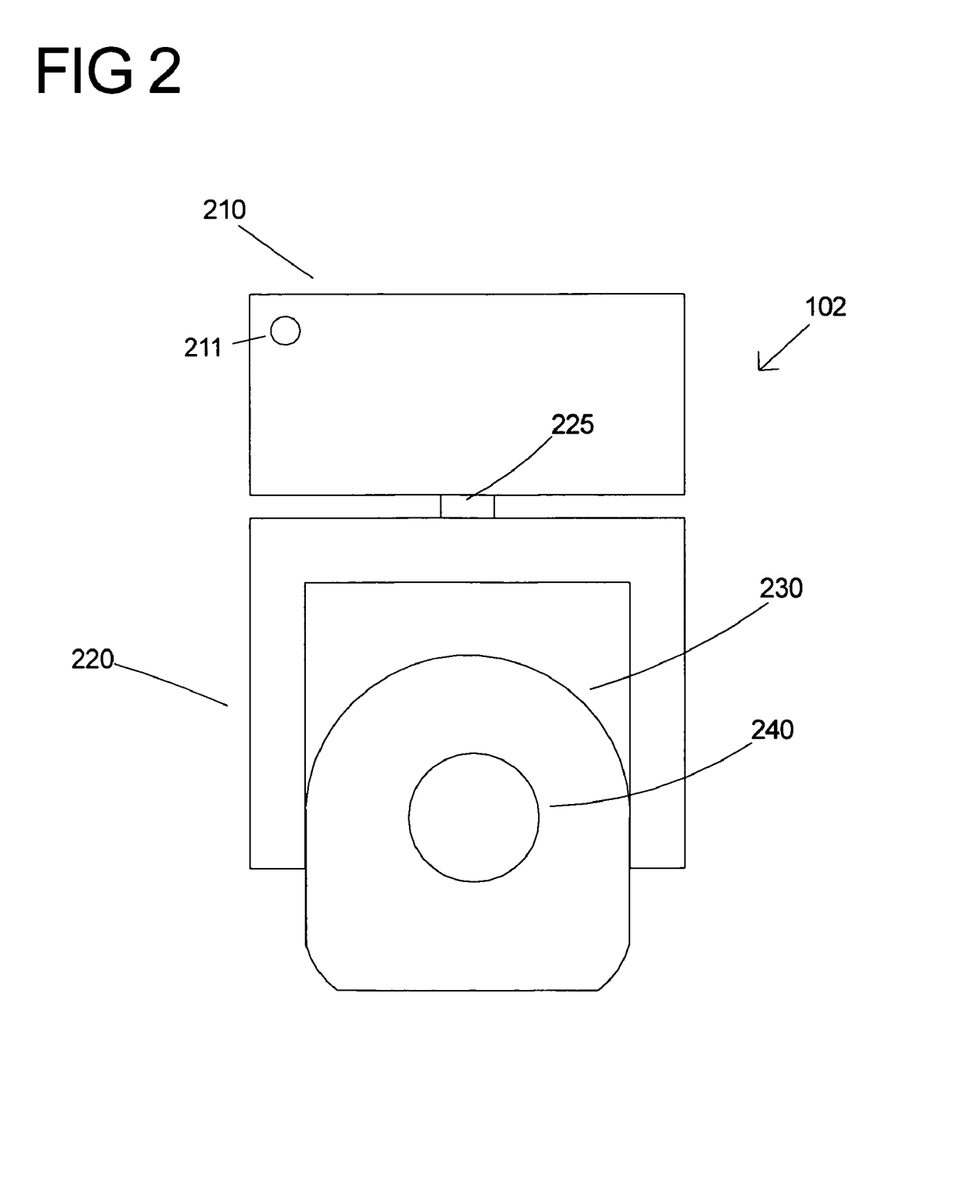
FIG. 2 shows an external view of the image projection lighting device of FIG. 1.

FIG. 2 shows a front view of an image projection lighting device 102 incorporating one or more embodiments of the present invention. The IPLD 102 includes a base or electronics housing 210, a yoke 220, and a lamp housing 230. The IPLDs 102 and 104 of FIG. 3 may each be identical to the IPLD 102 of FIG. 2.

Figure 3:
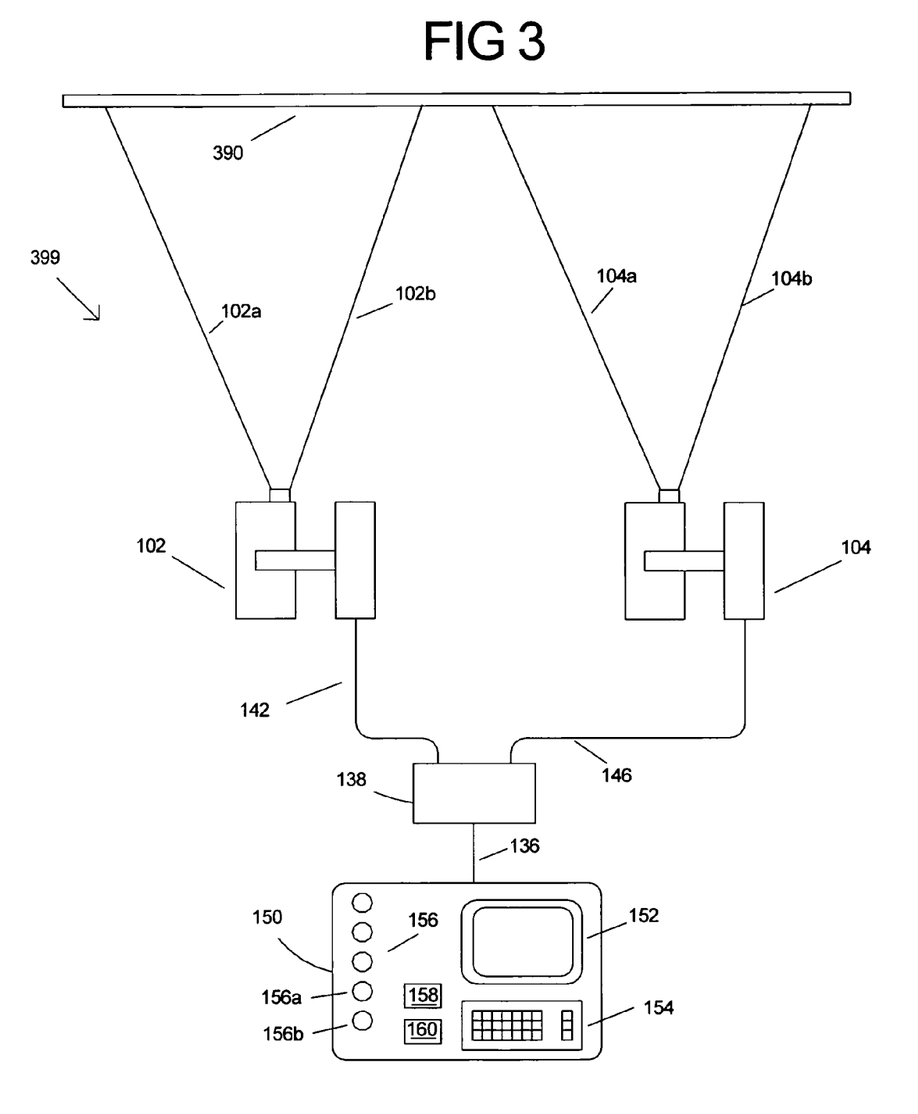
FIG. 3 shows a lighting system using two IPLDs and a central controller in accordance with an embodiment of the present invention.

The base housing 210 of the IPLD 102 includes a communications connection 211 for electrically connecting a communications line, such as communications line 142 shown in FIG. 3. The yoke 220 is physically connected to the housing 210 by a bearing 225, which allows the yoke 220 to pan or rotate in relation to the base or electronics housing 210. The lamp housing 230 is rotatably connected to the yoke 220 (bearings not shown for simplification), i.e. the lamp housing 230 is connected to the yoke 220 so that the lamp housing 230 can rotate with respect to the yoke 220. The lamp housing 230 typically contains optical components and light valves. An exit aperture 240 is shown for projecting lighted images from a projection lamp, such as a lamp 366 shown in FIG. 1. The projection lamp 366 shown in FIG. 1 is shown as a single lamp but it is known in the art to use two or more projection lamps working as a single projection lamp. IPLD 102 is shown with a separate base housing 210 and a lamp housing 230, however it is known in the art to produce an IPLD with a single housing using a mirror to position the projected light.

FIG. 3 shows a lighting system 399 that includes IPLDs 102 and 104. IPLDs 102 and 104 may each be functionally the same as IPLD 102 shown in FIGS. 1 and 2. Although only two IPLDs are shown for the lighting system 399 as many as one hundred or more IPLDs can be used to create a show. The central controller 150 has a keyboard entry device 154 and input devices 156 to allow an operator to input commands for controlling the IPLDs 102 and 104. The central controller 150 has a visual display monitor 152 so the operator can see the details of the show that the operator programs on the central controller 150. The central controller is also comprised of a processor or processing system 158 and a memory 160.

Lines 102a and 102b of FIG. 3 represent the projection field of IPLD 102 as lighting images are projected upon the projection surface 390. Lines 104a and 104b of FIG. 3 represent the projection field of IPLD 104 as lighting images are projected upon the projection surface 390.

The commands entered by the operator of the central controller 150 are sent over a communications system using communications lines 136, 142, 146 and communications interface 138 to the IPLDs 102 and 104 of FIG. 3. Each IPLD has an operating address that is different than the operating address of other IPLDs so that the operator can command a specific IPLD from a plurality of IPLDs. The operating address of a specific IPLD can be stored in the memory 315, shown in FIG. 1, or stored as a function of the input keypad 325. The desired operating address of a specific IPLD the operator wishes to control is input into the central controller 150 by inputting to the keyboard 154 or other input device of the central controller 150. The desired operating address is sent over the communication system by the central controller 150 where it is received by the plurality of IPLDs 102 and 104. A receiving IPLD, such as IPLD 102, receives the desired operating address at the communications port 311 of FIG. 1. The received operating address is compared with the operating address stored in the memory 315 of FIG. 1 and if the received operating address matches the operating address stored in the memory 315, of IPLD 102, for example, then next the IPLD 102 is ready to receive commands from the central controller 150. Once the desired IPLD has been addressed by the operator of the central controller 150 the operator may next send commands to select a first image or vary the other parameters of the addressed IPLD. Some of the parameters that can be varied are pan, tilt, strobe, focus and zoom. One of the parameters of the invention that may be varied is a contrast parameter. Another of the parameters of the invention that may be varied is a black level parameter. The images that are selected by the operator that can be projected by the IPLD 102 can originate from the central controller 150 or the content may originate from the memory 315 of FIG. 1.

A description of the operation of communication systems for image projection lighting devices can be found in U.S. Pat. No. 6,605,907 titled "Method, apparatus and system for image projection lighting" issued Aug. 12, 2003 and U.S. Pat. No. 6,331,756 titled "Method and apparatus for digital communications with multiparameter light fixtures" issued on Dec. 18, 2001 inventor Richard S. Belliveau, each incorporated by reference herein.

The images projected by IPLD 102 may be stored in the memory 315 of FIG. 3 or the images projected by the IPLD 102 may be stored at the control system 150 of FIG. 3. The images may be stored in either location as image data. The image data may be created by a graphics artist and the image data may not be optimized to produce the highest brightness levels on the projection surface 390 when the image data is projected by the IPLD 102. When the image data is not optimized to produce the highest brightness levels the images projected by the IPLD 102 onto the projection surface 390 may look dim when viewed by an observer of the lighting system 399. The observer may be the audience watching a show created with the images or the observer may be the operator of the central controller. IPLDs frequently are required to produce images of high brightness so if the image data is not optimized by the graphics artist to produce the highest brightness the images projected by the IPLD can be to dim in comparison with any ambient light.

The IPLD 102 of the invention is able to modify image data by varying a contrast parameter. The IPLD 102 of the invention is able to modify image data by varying a black level parameter. The contrast and black level parameters are similar to the contrast and black level adjustments found on a television set and the techniques are well known in the television art. In the television art however the term "brightness control" is sometimes referred to when controlling the black level of an image. In this disclosure we will use the term "black level" as the term better describes the intended function as it relates to the inventions disclosed. The contrast of an image can be increased or decreased by increasing or decreasing a gain or factor that is applied to the original image data as known in the television art. The black level of an image can be increased or decreased by adding or subtracting an offset to the original image data as known in the television art.

Figure 4A:
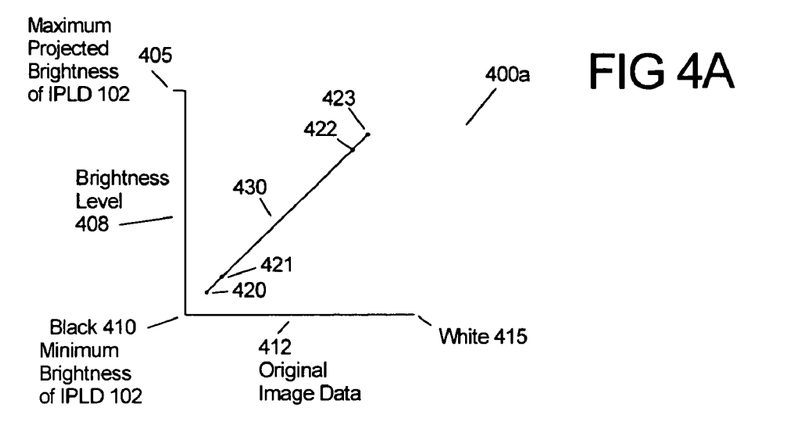
FIG. 4A shows a graph that depicts the brightness and a black level obtainable by an IPLD, such as the IPLD of FIG. 1, when projecting a first image.

FIG. 4A shows a graph 400a that depicts how image data or original image data 412 affects light output from the aperture 240 of the IPLD 102. The image data 412 shown in the graph 400a is data for one frame of a video or a still image. The y-axis is identified as 408. The x-axis is identified as 412. The y-axis 408 refers to the brightness level of light coming out of aperture 240 of the IPLD 102. The x-axis 412 refers to the image data 412 stored in the memory 315 of the IPLD 102 shown in FIG. 1. FIG. 4A also represents a case, where the image data or components of the image data 412 are unmodified. In FIG. 4A, point 405 on the y-axis 408 represents the maximum brightness of light that can be produced from the aperture 240 of the IPLD 102. Point 415 represents a component of the image data 412 retrieved from memory 315, which is intended to produce the brightest level of the image.

The line 430 represents the darkest to the brightest components of the image projected by the IPLD 102 as determined by the image data 412. The darkest component of the projected image is point 420. Point 421 represents a component of the projected image that is brighter than point 420. Point 422 represents a component of the projected image that is darker than point 423 but brighter than point 421. While only points 420, 421, 422 and 423 are shown as components of the image data 412 being projected at different brightness levels many more components of brightness levels can exist (not shown for simplification).

Point 423 represents the brightest component of the projected image as determined by the image data 412. The point 423 shows that the image data 412 does not drive the brightness level of the aperture 240 of the IPLD 102 to a maximum.

It is desirable when projecting the image data 412 from the IPLD 102 to project the brightest components of the image data 412 as brightly as possible. It is desirable when projecting the image data 412 from the IPLD 102 to project the darkest components of the image data 412 as black as possible.

Figure 4B:
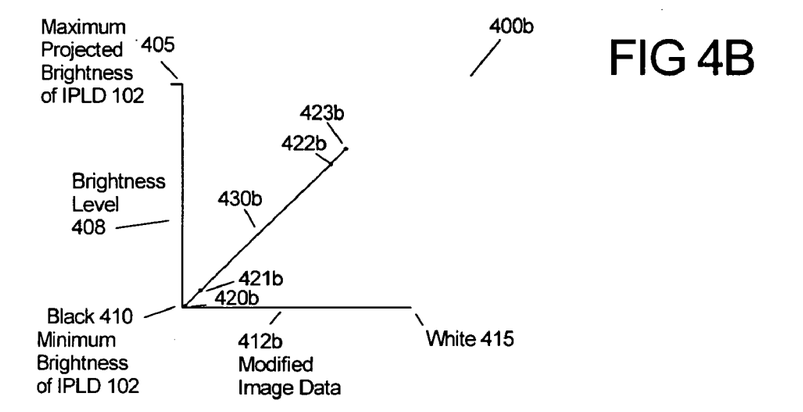
FIG. 4B shows a graph that depicts a first black level obtainable by an IPLD, such as the IPLD of FIG. 1, when the first image of FIG. 4A is modified by a black level parameter in accordance with an embodiment of the present invention.

FIG. 4B shows graph 400b. Graph 400b shows line 430b. Line 430b represents the darkest to the brightest components of an image projected by the IPLD 102 as determined by black level modified image data 412b. The graph 400b shows where the image data 412 has been modified by applying a black level parameter to affect a first offset to form black level modified image data 412b.

The black level parameter may be applied by microprocessor 316 to image data 412 in memory 315 to form the modified image data 412b. The black level parameter may be applied to the image data 412 stored in the memory 315 by the image control 312 shown in FIG. 1. The black level modified image data 412b can cause the darkest component to be shifted from point 420 for data 412 to point 420b for data 412b, to reach the best black level or minimum brightness of the IPLD 102. The brightest component of the projected image for the modified image data 412b is at point 423b which is downward from the brightest component at point 423 of the projected image for original image data 412. The brightest component has, in a sense, moved downwards because of the applied offset. The point 420b of line 430b is showing the darkest component of the image projected by IPLD 102 for modified image data 412b. Point 420b is reaches the lowest light output of the IPLD 102, which is shown as 410. Point 421b represents a component of the projected image for modified image data 412b that is brighter than point 420b. Point 422b represents a component of the projected image for modified image data 412b that is darker than point 423b but brighter than point 421b.

Figure 4C:
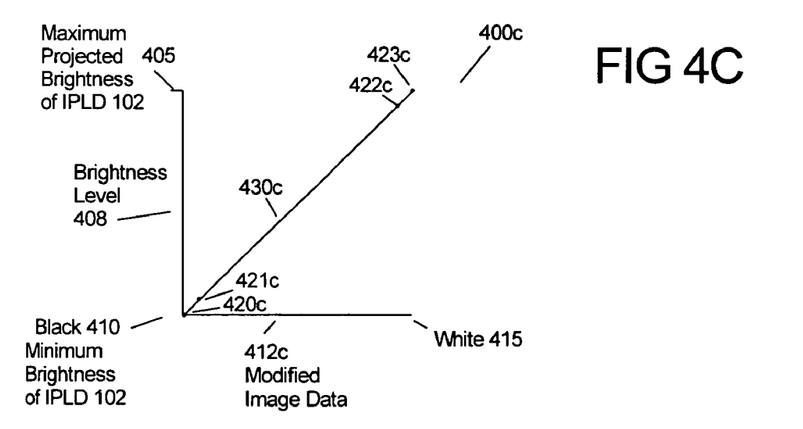
FIG. 4C shows a graph that depicts the first black level of FIG. 4B and a first brightness level obtainable by an IPLD, such as the IPLD of FIG. 1, when the first image of FIG. 4A is modified by a first contrast parameter and a first black level parameter in accordance with an embodiment of the present invention.

Next a contrast parameter will be applied to the black level modified image data 412b to raise the brightness level of an image projected by the IPLD 102 and to form modified image data 412c.

FIG. 4C shows graph 400c. Graph 400c shows line 430c. Line 430c represents the darkest to the brightest components of the image projected by the IPLD 102 as determined by a black level modified and contrast parameter modified image data 412c. The graph 400c shows where the image data 412 has been modified by applying a contrast parameter to affect a first change of gain and the black level parameter has been applied to affect a first offset to form modified image data 412c. The first offset is the same as applied in FIG. 4B.

The contrast parameter and the black level parameter may be applied by microprocessor 316 to the image data 412 in memory 315 to form modified image data 412c. The contrast parameter may be applied to the image data 412 in memory 315 by the image control 312. The modified image data 412c can cause the point 423c to be projected from aperture 240 at the maximum brightness level of the IPLD 102. The brightest component of the image data 412 was at point 423. The brightness component of the modified image data 412c is now at point 423c. In a sense, the brightest point has moved upward on the graph (i.e. to point 423c) towards the maximum brightness point 405, which is the maximum brightness capability of the IPLD 102. Point 421c represents a component of the projected image for modified image data 412c that is brighter than point 420c. Point 422c represents a component of the projected image for modified image data 412c that is darker than point 423c but brighter than point 421c.

The graph 400c shows that the brightest point 423c of the modified image data 412c is being projected by the IPLD 102 at maximum brightness corresponding to 405. The graph 400c shows that component 420c is being projected by the IPLD 102 at minimum brightness.

Figure 4D:
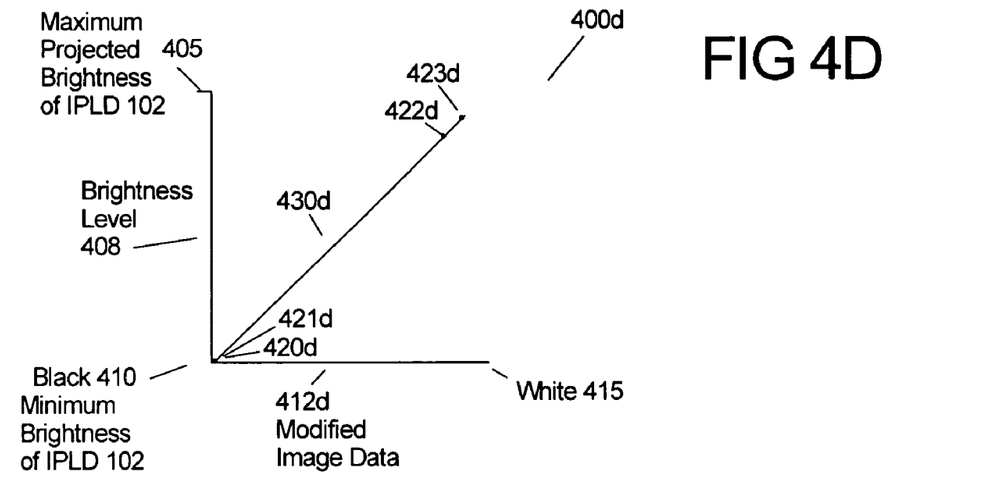
FIG. 4D shows a graph that depicts a second black level obtainable by an IPLD, such as the IPLD of FIG. 1, when the first image of FIG. 4A is modified by a second black level parameter in accordance with an embodiment of the present invention.

FIG. 4D shows graph 400d. Graph 400d shows line 430d. Line 430d represents the darkest to the brightest components of an image projected by the IPLD 102 as determined by the modified image data 412d. The modified image data 412d corresponds to the original data 412 modified by first and second black level offsets, and contrast parameter first change of gain. In graph 400d we show that we can apply even more offset (called a second amount of offset) to form modified data 412d that would, in a sense, shift the line 430c of FIG. 4C downward to form line 430d so that point 421d is at the minimum brightness level of the IPLD 102. Both points 420d and 421d are both projected at the optimum black level or the minimum brightness level of the IPLD 102. Line 430d shows that a second amount offset (which may be a greater amount of offset that the first offset applied in FIG. 4B) has been applied to form data 412d. The points 420d and 421d and any brightness points in between (not shown) are projected at minimum brightness by the IPLD 102. When the brightness components of the modified image data 412d that are not the minimum brightness components of the modified image data 412d (shown as point 421d) are projected by the IPLD 102 at minimum brightness by applying a black level parameter, all points in between the point 420d and 421d and including point 421d are considered clipped. Since the points 420d through 421d are all projected at minimum brightness any brightness differences between those points will not be visible in the projected image hence they are "clipped off". For many graphic images projected by the IPLD 102, clipping components of the original image so that greater contrast of the projected image can be obtained can be quite useful for lighting images.

Figure 4E:
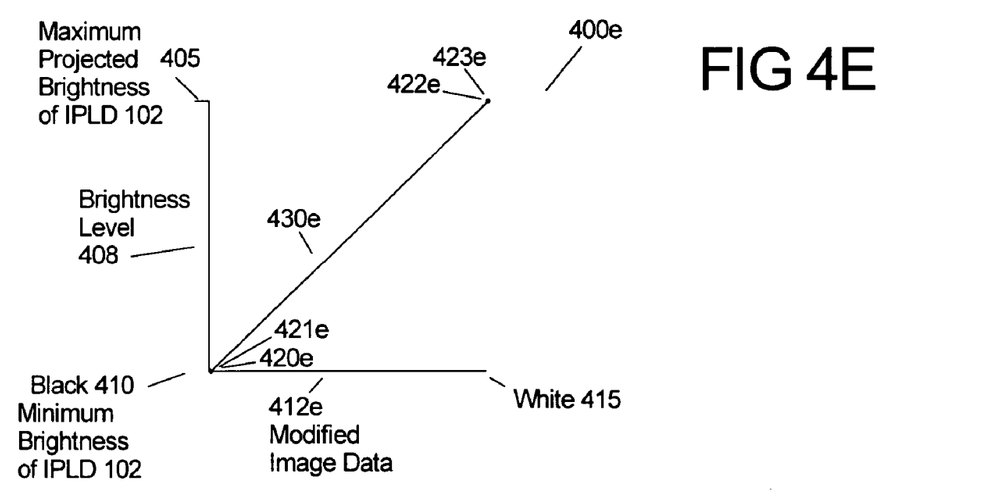
FIG. 4E shows a graph that depicts the second black level of FIG. 4E and a second brightness level obtainable by an IPLD, such as the IPLD of FIG. 1, when the first image of FIG. 4A is modified by a second contrast parameter and a second black level parameter in accordance with an embodiment of the present invention.

In FIG. 4E graph 400e shows line 430e. Line 430e represents the darkest to the brightest components of the image projected by the IPLD 102 as determined by modified image data 412e. The graph 400e shows where the image data 412 has been has been modified by applying first and second contrast parameters to affect a first and second change of gain (more gain than that shown in FIG. 4C) and the black level parameter to affect a first and second amount of offset. The second change in gain can be greater than the first amount of gain applied in FIG. 4C. The second amount of offset can be the same at that applied in FIG. 4D.

The second amount of gain applied in FIG. 4E causes an expansion from the line 430d to the line 430e so that brightness point 423e and 422e both are projected at the maximum brightness level of the IPLD 102 shown as point 405. Since the points 422e through 423e are all projected at maximum brightness and any brightness differences between those points (not shown for simplification) are not visible in the projected image hence they are "clipped off". For many graphic images projected by the IPLD 102, clipping the brighter components of the original image so that greater brightness of the projected image can be obtained can be quite useful for producing brighter images for lighting. A little loss of brightness detail of the projected image in compromise for an overall brighter image can be desirable for lighting applications requiring high brightness levels. As more gain is applied to the original image more clipping of the original image components is introduced in compromise for a brighter projected image. In practice it has been found that clipping the brightest or the darkest original image components by 10% or greater can produce brightly contrasted desirable images as projected by the IPLD.

The contrast parameter can apply a gain to the original image data of an image that was provided by a graphics artist. The amount of gain could be adjustable or the amount of gain could be controlled automatically. The automatic control of the gain could be controlled by the processor 316 or the image control 312. This automatic control of the gain could be accomplished by a function that automatically applies gain to the original image data until the maximum peak brightness level is achieved. A function applied to expand the image data like the expansion shown from line 423b of FIG. 4B to form line 423c of FIG. 4C is considered applying a gain.

The black level parameter can apply an offset to the original image data of an image that was provided by a graphics artist. The amount of offset could be adjustable or the amount of offset could be controlled automatically. The automatic control of the offset could be controlled by the processor 316 or the image control 312. This automatic control of the offset could be accomplished by a function that automatically applies an offset to the original image data or original image until the minimum brightness level is achieved for the darkest part of the original image.

If a great amount of gain is applied to the original image or original image data the brighter components of the original image will lose distinction. This is known as clipping the brighter parts of the original image. The contrast parameter can be adjusted by the operator so that the amount of clipping can be controlled relative to the best visual outcome as determined by the operator.

If a large amount of offset is applied to the original image or original image data the darkest parts of the original image will lose distinction. This is known as clipping the darkest parts of the original image. The black level parameter can be adjusted by the operator so that the amount of clipping can be controlled relative to the best visual outcome as determined by the operator.

An operator of the central control system 150 of FIG. 3 may first address an IPLD 102 the operator wishes to control. If the operator wishes to control the IPLD 102 then the operator of the central control system 150 enters the correct operating address of the IPLD 102 by inputting to the keyboard device 154. The operating address is sent over the communications system comprised of lines 136, 142 and 146 as well as communications interface 138. The operating address for the IPLD 102 is received at the communications port 311 of FIG. 1. The communications port 311 forwards the operating address to the processor 316 where it is compared to the operating address stored in the memory 315. If the received operating address matches the operating address stored in the memory 315 the processor 316 may then accept a command.

The operator of the central controller 150 next decides to project an image from the IPLD 102. The operator enters the image identifying command of a first image the operator would like the IPLD 102 to project over the communications system. The image identifying command is received by the communications port of IPLD 102 and sent to the processor 316. The processor 316 extracts the first image data from the image data stored in the memory 315 and sends the first image data to the image control 312 where the first image is processed and sent as control signals to the light valves 375, 376 and 377. The light valves 375, 376 and 377 of IPLD 102 form the first image and the first image is projected by the light from the lamp 366 passing through the light valves and is focused upon the projection surface 390 by lens 368 through aperture 240.

If the operator wishes to optimize the contrast of the first image projected by IPLD 102 the operator may enter a contrast command into the central controller 150. The contrast command may be entered by the operator by inputting the contrast command to any of the input devices 154 or 156. The contrast command may be sent over the communications system to be received by the communication port 311 of IPLD 102. The communications port 311 sends the contrast command to the processor 316. The processor 316 in accordance with the operational code stored in the memory 315 sends a signal to the image control 312 to apply the contrast command to the first image or first image data thus modifying the contrast parameter. The contrast command can cause the image control to apply a gain to the first image data to produce a second image data with modified contrast. The contrast command may vary the gain to be applied or the contrast command may be several commands that apply variable gain to the first image data to create a set of second image data or a set of third image data.

If the operator wishes to optimize the black level of the first image projected by IPLD 102 the operator may also enter a black level command into the central controller 150. The operator sends the command from the central controller 150 by inputting the black level command to the appropriate input devices 154 or 156. The contrast command may be sent over the communications system to be received by the communication port 311 of IPLD 102. The communications port 311 sends the contrast command to the processor 316. The processor 316 in accordance with the operational code stored in the memory 315 sends a signal to the image control 312 to apply the black level command to the first image thus modifying the black level parameter. The black level command can cause the image control to add or subtract an offset to the original image data to produce a set of second image data with modified black level. The black level command may cause a single offset to be applied or subtracted or the black level command may be several commands that add or subtract multiple offsets to the first image to create a set of second image data or a set of third image data.

The images projected by the IPLDS 102 and 104 on to the projection surface 390 may also originate at the central controller 150. In this case the operator of the central controller 150 may first select an IPLD from a plurality of IPLDS that the operator wishes to project an image. An operator of the central control system 150 shown in FIG. 3 may first address an IPLD the operator wishes to control. If the operator wishes to control the IPLD 102 then the operator of the central controller 150 enters the correct operating address of the IPLD 102 by inputting to the keyboard device 154. The operating address is sent over the communications system comprised of lines 136, 142 and 146 as well as communications interface 138. The operating address for the IPLD 102 is received at the 311 of FIG. 1. The communications port 311 forwards the operating address to the processor 316 where it is compared to the operating address stored in the memory 315. If the received operating address matches the operating address stored in the memory 315 the processor 316 may then accept an image to project from the central controller 150.

The operator of the central controller 150 may then select a first image from the images stored in the memory 160 of the central controller 150. The first image is then sent over the communications system to the IPLD 102 to be projected on to the projection surface 390.

If the operator wishes to optimize the contrast of the first image projected by the IPLD 102 the operator may enter a contrast command into the central controller 150. The contrast command may be entered by the operator by inputting the contrast command to the input device 156a. The central controller 150 of FIG. 3 may then apply a gain to the first image data stored in the memory 160 in operation with processor 158 to produce a second image data with modified contrast. The second image data is sent over the communications system to the IPLD 102 to be projected onto the projection surface 390.

If the operator wishes to optimize the black level of the first image projected by the IPLD 102 the operator may enter a black level command into the central controller 150. The black level command may be entered by the operator by inputting the black level command to input device 156*b*. The central controller 150 of FIG. 3 may then add or subtract an offset to the original image data stored in the memory 160 in operation with the processor 158 to produce a second image data with a modified black level. The second image data is sent over the communications system to the IPLD 102 to be projected onto the projection surface 390.

The contrast control offered by the contrast parameter applies a gain function equally to the red, green and blue components of an original image so that the image color balance (or coloration) of the red, green and blue components or the original image is not substantially changed. That is to say the colors of the image looks similar but is brighter or of more contrast. The new image created from the original image by applying the contrast parameter substantially preserves the original image coloration but allows greater contrast between the lightest and darkest components of the image.

The black level control offered by the black level parameter applies an offset function equally to the red, green and blue components of an original image so that the image coloration of the original image is not substantially changed. The new image created from the original image by applying the black level parameter substantially preserves the original image coloration but allows the darkest components of the image to obtain the best black level. The colors of the image looks similar but is brighter or of more contrast.

The IPLD 102 may respond to contrast and/or black level commands received by the communication port 311 as sent over the communications system. The contrast and/or black level commands can be acted upon by the processor 316. The processor 316 may perform the contrast and/or black level functions on the first image data to create a second image data or the processor may send control signals to the image control 312. The image control 312 may then perform the contrast and/or functions to the first image data to create a second image data with the modified contrast and black level parameters.

The IPLD 102 may also respond to contrast and/or black level commands received by the stand-alone control system 326. The processor 316 may respond to commands received by the stand-alone control system 326 much the same as the processor 316 responds to commands received over the communication port 311. The stand-alone control system 326 may be used by an operator to vary the contrast and black level parameters of an image.

I claim:

1. A stage lighting apparatus comprising an image projection lighting device comprising:
    a base housing in which is located an electrical component;
    a yoke;
    a communications port;
    a processor;
    a memory;
    a lamp housing;
    wherein the lamp housing can be remotely positioned in relation to the base;
    wherein the following is located within the lamp housing:
        a lamp,
        and a first light valve; and
    wherein the communications port receives operational commands and image data, wherein the image data is stored in the memory as first image data, wherein the first image data has a first image coloration and a first black level;
    wherein the communications port receives a black level command specifying an offset;
    wherein the processor acts on the black level command to apply the offset to the first image data to create second image data, wherein the second image data has a second image coloration and a second black level;
    wherein the first image coloration of the first image data is substantially the same as the second image coloration of the second image data, and the first black level of the first image data is substantially different from the second black level of the second image data;
    and wherein the second image data is used in conjunction with the first light valve to form a projected image.

2. The stage lighting apparatus of claim 1 further comprising
    an image control and
    wherein the processor is a component of the image control.

3. The stage lighting apparatus of claim 2 wherein
    the offset applied to the first image data causes clipping of darker components of a first image corresponding to the first image data.

4. The stage lighting apparatus of claim 3 wherein
    the clipping is greater than ten percent.

5. The stage lighting apparatus of claim 2 wherein the processor is a graphics processor.

6. The stage lighting apparatus of claim 1 wherein
    the processor extracts the first image data from the memory.

7. The stage lighting apparatus of claim 1 wherein
    the first image data is processed and sent to the first light valve and the first light valve forms at least a part of the first image.

8. The stage lighting apparatus of claim 1 wherein
    the communications port can also receive a contrast command and a contrast command can be applied to the first image.

9. A stage lighting apparatus comprising an image projection lighting device comprising:
    a base housing in which is located an electrical component;
    a yoke;
    a communications port;
    a processor;
    a memory;
    a lamp housing;
    wherein the lamp housing can be remotely positioned in relation to the base;
    wherein the following is located within the lamp housing:
        a lamp,
        and a first light valve; and
    wherein the communications port receives operational commands;
    wherein image data is stored in the memory as first image data;
    wherein the first image data has a first image coloration, a first black level and a first contrast;
    wherein at least a portion of the first image data can be projected as a first projected image by the lamp operating in conjunction with the first light valve;

wherein the communications port receives a black level command and a contrast command;

wherein the processor acts on the black level command to vary the black level and the processor acts on the contrast command vary the contrast of the first image data to create a second image data, wherein the second image data has a second image coloration, a second black level and a second contrast;

wherein at least a portion of the second image data can be projected as a second projected image by the lamp operating in conjunction with the first light valve;

wherein the first image coloration of the first projected image data is substantially the same as the second image coloration of the second projected image, the first black level of the first image data is substantially different from the second black level of the second image data and the first contrast is substantially different from the second contrast level of the second image;

and wherein the second image data is used in conjunction with the first light valve to form a projected image.

10. The stage lighting apparatus of claim 9 further comprising
an image control; and
wherein the processor is a component of the image control.

11. The stage lighting apparatus of claim 9 wherein
the black level command causes an offset to be applied to the first image data that results in the clipping of darker components.

12. The stage lighting apparatus of claim 11 wherein
the clipping is greater than ten percent.

13. The stage lighting apparatus of claim 9
wherein the processor is a graphics processor.

14. The stage lighting apparatus of claim 9
wherein the processor can extract the first image data from the memory 15. The stage lighting apparatus of claim 9 further comprising
a stand alone control system and
wherein the stand alone control system may also be used to by an operator to apply contrast or black level commands.

16. The stage lighting apparatus of claim 15
wherein the stand alone control system is comprised of a video display.

17. The stage lighting apparatus of claim 16 wherein
the video display is a touch screen display.

18. The stage lighting apparatus of claim 15 wherein
the stand alone control system is comprised of an input keypad.

* * * * *